March 22, 1960  G. ASSALINI  2,929,745
ION EXCHANGE PURIFICATION PROCESS
Filed July 19, 1957

United States Patent Office 2,929,745
Patented Mar. 22, 1960

2,929,745

ION EXCHANGE PURIFICATION PROCESS

Giuseppe Assalini, Genoa, Italy, assignor to Rohm & Haas Company, Philadelphia, Pa., a corporation of Delaware Application July 19, 1957, Serial No. 673,095

8 Claims. (Cl. 127—46)

This invention relates to processes and apparatus for the purification of raw sugar juices.

Various experiments have been effected for the purification of raw sugar juice by using ion exchange resins. In no case, however, has there been reached any practical result which could be applied on an industrial scale: so much so that the treatment with ion exchange resins has been adopted for industrial purposes only on rare occasions, and to all events only after the normal purification. Such well known purification consists in adding several times a quantity of lime with double carbonation with consequent installation of lime furnaces and turbo-compressors for $CO_2$. Otherwise it consists in a calco-sulphurous treatment, and in any case it requires repeated filtrations and heating, with consequent loss of heat and sugar and also waste of time and labor.

The present invention relates to the use of synthetic ion exchange resins for the purification of sugar juices as they are obtained from diffusion or crushing and pressing, the juices being derived from any raw material. The sugar for purification may also be obtained from molasses. The process of the invention allows one to reduce or even eliminate any other previous method of purification, including the calco-carbonic and calco-sulphurous processes, thus economizing in the cost of plant, time and labor.

The method according to the present invention is characterized by the fact that either the sugar juice or eventually the molasses (this previously partly demineralized) are treated at room temperature with an ion exchange resin prepared in an hydroxide form, thus obtaining that the salts contained in the abovesaid juice are separated and transformed into the corresponding hydroxide.

The method is also characterized by the fact that the alkaline solution containing the abovesaid hydroxide is treated with a chemical compound, preferably of metallic character, capable of transforming into salt by the hydrates previously formed, and at the same time acting as a defecant, decoloring and in all respects purifying, allowing bringing the organic non-sugar to a state easily and quantitatively coagulable and therefore eliminable.

The method is also characterized by the fact that the juice, obtained after the filtration of the coagulate, is treated with an anionic resin and with a cationic resin, thus obtaining a complete purification, and the filtrate obtained will thus reach the pH required, extracting the maximum percentage of sugar and reducing to the minimum the residual traces of impurity.

In a particularly preferred instance, the method is characterized by the fact that the filtrate is treated firstly with the anionic resin and after with the cationic resin.

In the instance in which the method starts from molasses, such procedure is characterized by the fact that the molasses, diluted in a quantity of water corresponding to one half of its weight, is previously treated with a normal couple of ion exchanging resins anionic and cationic, with the object of reducing the impurity up to the point which is necessary to reach in order to obtain the subsequent purification above mentioned.

The plant for the purification of sugar juices, according to the invention, is characterized by the presence, combination and succession of the various devices and apparatuses suitable to obtain the various stages of the method.

In the annexed drawings there is diagrammatically shown, as a mere example, the plant and the cycle of the various operations relative to the method according to the invention.

Figure 1:
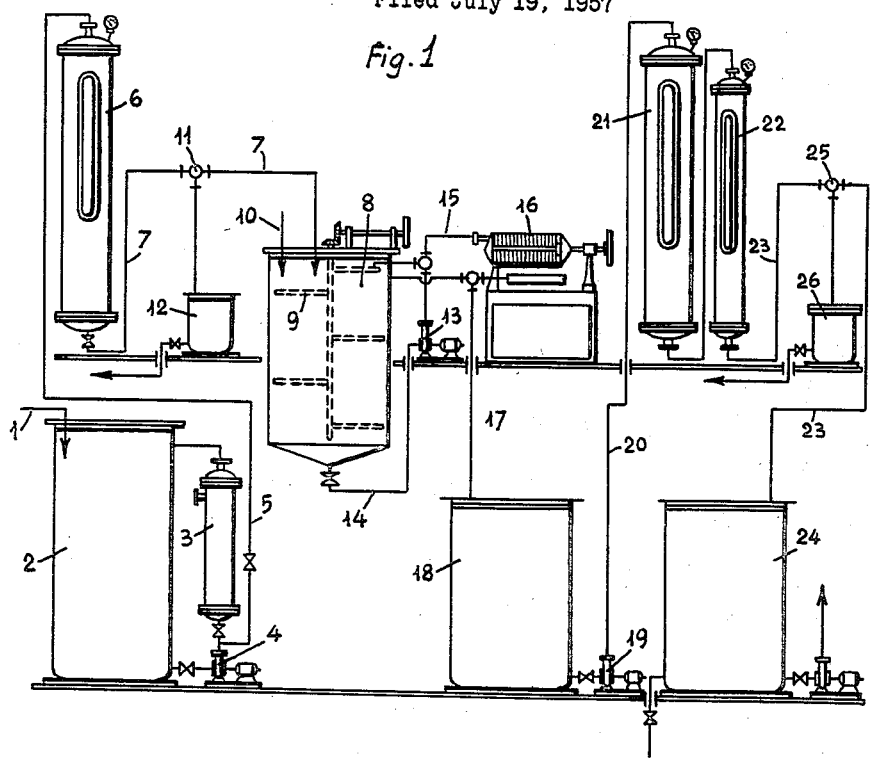
Fig. 1 shows a diagrammatic view of the plant for the purification of raw sugar juices.

Referring to Fig. 1 the raw sugar juice which enters through 1 into tank 2 is cooled in heat exchanger 3, and is passed by the pump 4 along the piping 5 into the ion exchanger 6, where there is effected by means of an ion exchange resin the splitting of salts and their transformation into hydroxides. When coming out of the exchanger 6, the alkaline solution containing the hydroxides is passed through pipe 7 into tank 8 containing an agitator 9, where by addition through 10 of a water-soluble metal salt yielding a water-insoluble metal hydroxide there are effected the operations of defecation, decolorization and purification with resultant coagulation of the non-sugar organic substances. On the pipe 7 is fitted a three-way valve 11 which through the tank 12 eliminates in known manner regenerant and wash waters which come from the resin bed. The pump 13 through pipes 14 and 15 sucks from tank 8 the solution and sends same to filter 16 where the sugar juices are separated from the precipitate which has been formed during the treatment. The sugar juices are collected and transferred through pipe 17 into tank 18, from which pump 19 sucks them into pipe 20 and thus to ion exchangers 21 and 22 where the filtrate contacts an anionic resin and a cationic resin, thus providing final purification. In the preferred procedure the anionic resin is a strongly basic resin such as a quaternary ammonium hydroxide resin and the cationic resin is a weakly acidic resin such as a carboxylic resin.

Through pipe 23 the purified product containing a maximum percentage of sugar and minimum traces of impurities is conveyed to tank 24 and subsequently to the usual finishing operations such as evaporation and/or crystallization. On pipe 23 there is fitted a three-way valve 25 which through tank 26 eliminates in known manner the regenerant and wash which come from the resin beds in ion exchangers 21 and 22.

Figure 2:
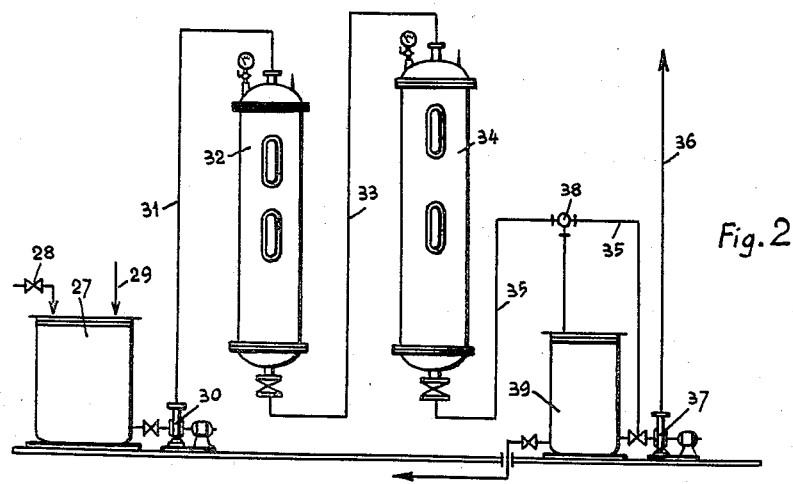
Fig. 2 shows the diagrammatic view of the plant for the previous treatment of molasses.

With reference to Fig. 2 molasses is introduced into tank 27 through 28 and through 29 diluting water is fed. The diluting water is usually maintained at a quantity equal to about one half of the quantity of molasses to be diluted.

For industrial application of the method by means of the plant shown in Fig. 1, the diluted molasses should be pretreated by the method indicated in Fig. 2. Pump 30 sends the diluted molasses through pipe 31 to ion exchanger 32, where it meets a cationic resin and then through pipe 33 into exchanger 34 where it meets an anionic resin. On coming out of this latter exchanger, the solution of molasses, which by now has acquired a sufficient grade of purity, passes through pipes 35 and 36 to tank 2 (Fig. 1) with the aid of pump 37. On pipe 35 is fitted a three-way valve 38, which through tank 39 eliminates in known manner regenerant and waters which come from the resin beds in the ion exchangers 32 and 34.

As regards the above described method, these further advantages are pointed out. The ion exchange as effected according to the present invention with synthetic resin allows the elimination of previously used purifying process since one is able to go by means of the plant and process of the invention directly from a raw juice to a purified juice of purity superior to that previously achieved. The employment of a strongly basic resin in hydroxide form combined with the subsequent treatment with a metallic salt, for instance iron, aluminum or manganese, allows rapid formation of metallic hydroxide with high coagulating and decolorizing properties. Another advantage is that one avoids in the process of the invention a pH sufficiently acidic so as to be deleterious.

There is the marked advantage that all operations are effected at room temperatures. There is furthermore the possibility in the case of molasses to operate upon a solution of molasses containing only about 50 parts of water per 100 parts of original molasses with consequent appreciable economies in operating, labor and time.

Example I

Although the process about to be described is continuously carried out, it is convenient to deal with a unit of 700 liters of solution passing through the various steps of the process. There are taken 700 liters of an aqueous solution of juice obtained from best cosettes by diffusion containing 10% of sucrose and 2.5% of non-sugars, of this 0.5% being inorganic and 2.0% being organic. The temperature of this solution is brought to about 40° C. and the solution is then passed through a bed of a strongly basic anion exchange resin, a porous, cross-linked styrene resin having quaternary ammonium hydroxide groups attached through a methylene group to the rings from the styrene and carrying on the nitrogen two methyl groups and a hydroxyethyl group. The rate of flow is 0.7 gal. per cubic foot per minute. In place of this particular resin there can be here used any other of the strongly basic quaternary hydroxide resins. The effluent from the resin bed has a pH of 11 to 12 or more.

The effluent is now treated with an aqueous 30% solution of aluminum sulfate hydrate, $Al_2(SO_4)_3 \cdot 18H_2O$. This solution is added slowly with good agitation. For the 700 liter unit passing through the process there are added in this particular case 13.1 kilograms of this solution. The amount of metal salt solution added at this point may vary with the particular lot of sugar juice being treated. In this case the solution added brings the pH of the solution to 5.7. A pH range of 5 to 6 is generally satisfactory.

A precipitate of hydrated aluminum oxide forms and this collects or coagulates organic non-sugars including coloring matter. The precipitate is separated. This is accomplished in this instance by filtration, but centrifugation or settling with removal of clear liquor and filtering or centrifuging of the sludge has been found at least as effective and with some sources of sugars even more desirable.

At this point it is possible to obtain a white product, but there remain traces of organic materials which may later lead to development of slight discoloration and also there are inorganic salts. Hence, at this point it is desirable although not absolutely essential that the sugar solution be treated with anionic and cationic resins. In this particular case this is done by passing the solution through a quaternary ammonium hydroxide resin consisting of cross-linked styrene resin having trimethyl-ammonium methyl groups and then through a carboxylic cation exchange resin in hydrogen form at a rate of two gallons per cubic foot per minute. This resin is one formed by copolymerizing methacrylic acid with a few percent of divinylbenzene.

The effluent from the last ion exchange column has a pH of 6.2. It has a Stammer color of 0.515, contains about 8.5% of sucrose, 0.037% of invert sugar, 0.003% of ash, 0.033% of total nitrogen, and 0.002% of chlorine. It is passed to the evaporator and concentrated. The first strike sugar has a purity of 98.1% as obtained with purity of 99.43% on a dry basis. It contains no nitrogen.

Glutamic acid, aspartic acid, and leucine are recoverable from the filter cake obtained from the precipitation with aluminum sulfate, as is also the aluminum content. There are also amino acids in the molasses and these are also recoverable.

Example II

The same general procedure is applied to a syrup made from raw cane sugar. A solution is made at 40° Brix and is filtered. It is passed at 40° C. through a strongly basic quaternary ammonium hydroxide anion exchange resin consisting of cross-linked polystyrene having trimethyl ammonium methyl groups, as above. The effluent has a pH of about 11. This is treated with 12 kilograms of aqueous 30% aluminium sulfate hydrate solution. A precipitate forms which is settled in a tank, from which clear upper liquor is withdrawn and filtered. Sludge is also withdrawn and filtered. The filtrate is clear and has a pH of 5.6. It is passed through a mixed bed consisting of approximately equivalent amounts of an acidic carboxylic cation exchange resin and a quaternary ammonium hydroxide resin like that described just above. The thus treated syrup contains no calcium or potassium and about 8 p.p.m. of sodium. No increase in invert sugar is found. The syrup is now ready for concentration, the sugar obtained being brilliantly white, 99.5% pure.

Example III

With the same treatment as explained in Example I tests have been carried out instead of with diffusion juice, with juice obtained directly by squeezing the beets, said juice had the following analysis, in the quantity of 500 litres: saccharose 16.25%; Bx 19.55; Qz 83.12; pH 5.50; NZT 3.30%; NZM 0.78%; NZO 2.52%; NZO nitrogened 1.45%; NZO non-nitrogened 1.07%.

During the stages of the process there were no differences as compared with the working with the diffusion juice and the final effluent juice had the following characteristics: saccharose 9.44%; Bx 9.72; Qz 97.12; pH 5.71; Stammer color 0.097; invert sugar 0.037; ashes 0.002%; total nitrogen 0.039%; chlorine 0.001%. The final sugar obtained had a purity Qz 98.72.

Example IV

Other tests have been carried out with the same quantities and with the same juices as described in Examples I, II and III substituting in the chemical treatment a corresponding quantity of iron chloride to the alluminium sulphate and the final results have confirmed the achievements obtained as per Examples No. I, II and III.

Although for descriptive reasons this present invention has been based upon what has been described and illustrated as a matter of example, many other realizations and modifications can be applied to the embodiment of the invention, such as for instance by effecting the pretreatment of molasses in a single column containing a mixed bed of anionic and cationic resins, and similarly by replacing the two columns 21 and 22 with one column containing a mixed bed of anionic and cationic resins.

This application is a continuation in part of Serial No. 571,770, filed March 15, 1956, and now abandoned.

What is claimed is:

1. Process for the purification of sugar juices by means of synthetic ion exchange resins comprising treating the sugar juices at least at room temperature with an ion exchange resin in hydroxide form whereby salts in such juices are converted into the corresponding hydroxides, and treating the juices containing said hydroxides with a water-soluble metal salt yielding a water insoluble metal hydroxide with resultant coagulation of organic non-sugars.

2. Process according to claim 1 wherein the sugar juices treated are derived from molasses, comprising diluting the molasses with a quantity of water corresponding to about one half of its weight and treating the same with cationic and anionic resins.

3. Process according to claim 1 wherein the water-soluble metal salt is an iron salt.

4. Process according to claim 1 wherein the water-soluble metal salt is a manganese salt.

5. Process according to claim 1 wherein the juice obtained after removal of the insoluble metal hydroxide and coagulated organic non-sugars is treated with an anionic resin in basic form and with a cationic resin in hydrogen form.

6. Process according to claim 5 wherein the filtrate is first treated with a strongly basic anionic resin and subsequently with a weakly acidic cationic resin.

7. Process according to claim 1 wherein the water-soluble metal salt is an aluminum salt.

8. Process according to claim 7 wherein the water-soluble metal salt is aluminum sulfate.

References Cited in the file of this patent

UNITED STATES PATENTS

| | | |
|---|---|---|
| 2,155,318 | Liebknecht | Apr. 18, 1939 |
| 2,403,177 | Gustofson | July 2, 1946 |
| 2,635,061 | McBurney | Aug. 14, 1953 |
| 2,649,390 | Winters et al. | Aug. 18, 1953 |